United States Patent
Kitani

(10) Patent No.: US 8,699,016 B2
(45) Date of Patent: Apr. 15, 2014

(54) PROGRESSIVE POWER LENS, METHOD OF DESIGNING PROGRESSIVE POWER LENS AND METHOD OF EVALUATING PROGRESSIVE POWER LENS

(71) Applicant: Hoya Corporation, Tokyo (JP)

(72) Inventor: Akira Kitani, Tokyo (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 13/971,330

(22) Filed: Aug. 20, 2013

(65) Prior Publication Data

US 2014/0016120 A1    Jan. 16, 2014

Related U.S. Application Data

(62) Division of application No. 12/920,784, filed as application No. PCT/JP2009/066954 on Sep. 29, 2009, now Pat. No. 8,534,834.

(30) Foreign Application Priority Data

Sep. 30, 2008 (JP) ................................. 2008-254410

(51) Int. Cl.
    *G01B 9/00* (2006.01)
(52) U.S. Cl.
    USPC .......................................................... 356/124
(58) Field of Classification Search
    USPC .......................................................... 356/124
    See application file for complete search history.

(56) References Cited

U.S. PATENT DOCUMENTS

| | | | |
|---|---|---|---|
| 3,687,528 A | 8/1972 | Maitenaz | |
| 4,606,622 A | 8/1986 | Fuëter et al. | |
| 5,083,859 A | 1/1992 | Jalie | |
| 5,270,745 A | 12/1993 | Pedrono | |
| 5,666,184 A | 9/1997 | Umeda et al. | |
| 5,710,615 A * | 1/1998 | Kitani | 351/159.42 |
| 7,364,294 B2 * | 4/2008 | Menezes | 351/159.06 |
| 2006/0203193 A1 | 9/2006 | Kato | |

FOREIGN PATENT DOCUMENTS

| | | |
|---|---|---|
| JP | A-49-003595 | 1/1974 |
| JP | A-57-010113 | 1/1982 |
| JP | A-64-005682 | 1/1989 |
| JP | A-02-216428 | 8/1990 |
| JP | A-3-196119 | 8/1991 |
| JP | A-03-230114 | 10/1991 |

(Continued)

OTHER PUBLICATIONS

International Search Report in International Application No. PCT/JP2009/066954; dated Jan. 19, 2010 (with English-language translation).

(Continued)

*Primary Examiner* — Roy M Punnoose
(74) *Attorney, Agent, or Firm* — Oliff PLC

(57) ABSTRACT

Improving the optical state of a progressive addition lens along a principal line of vision through which the line-of-sight of a wearer passes by making the displacement of a position at which an optical state becomes the best to be the same as the amount of inward movement of line-of-sight, when the wearer moves his line-of-sight from the front far distance to the front near distance. An expression OI<DH may be satisfied to improve such an optical state of the progressive addition lens.

8 Claims, 10 Drawing Sheets

(56) References Cited

FOREIGN PATENT DOCUMENTS

| | | |
|---|---|---|
| JP | A-2002-122825 | 4/2002 |
| JP | A-2005-201992 | 7/2005 |
| JP | A-2006-285200 | 10/2006 |
| JP | A-2007-148458 | 6/2007 |

OTHER PUBLICATIONS

Notification of Reasons for Refusal dated Mar. 26, 2013 from Japanese Patent Application No. 2010-531859 (with English-language translation).

* cited by examiner

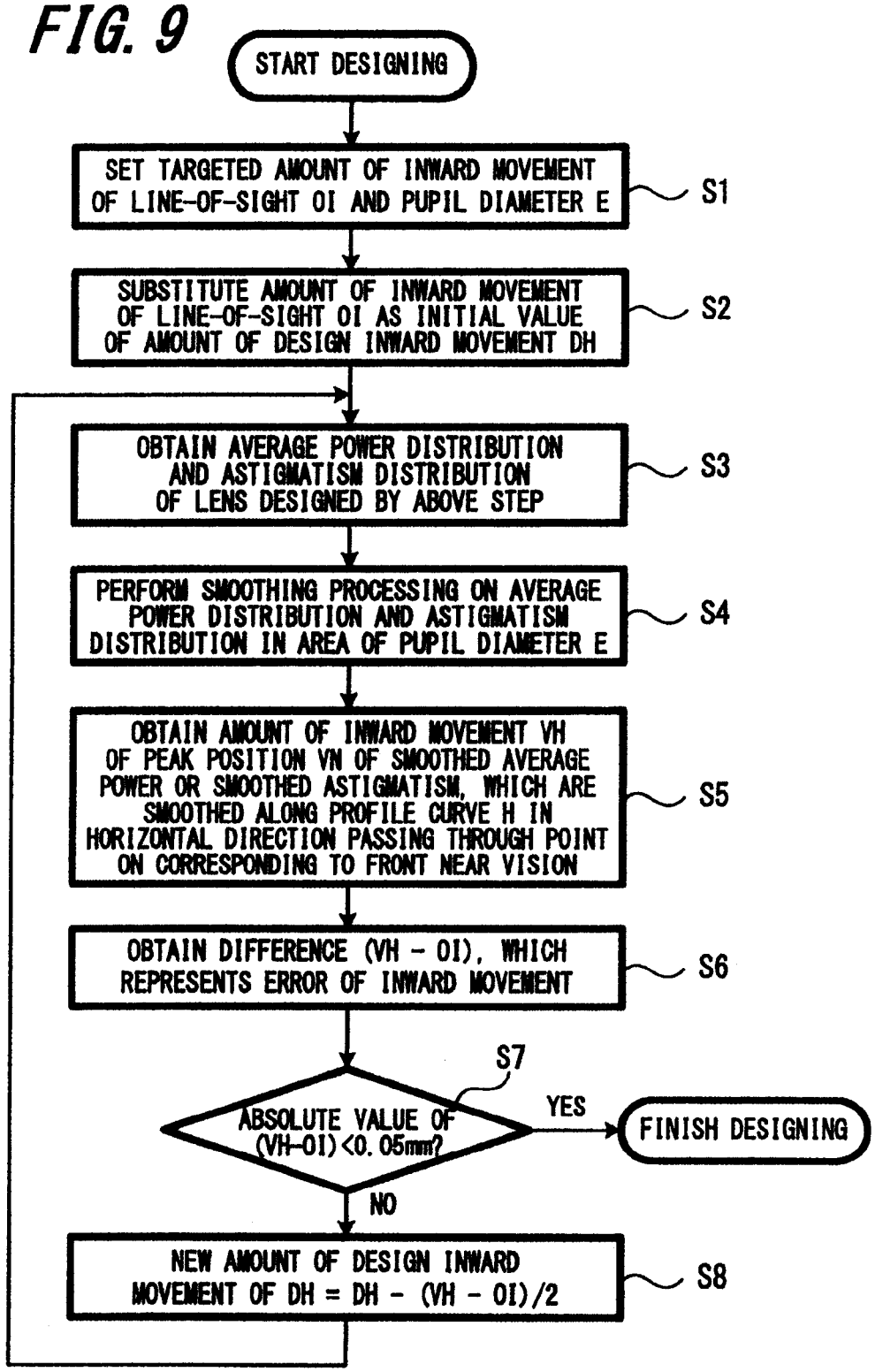

PROGRESSIVE POWER LENS, METHOD OF DESIGNING PROGRESSIVE POWER LENS AND METHOD OF EVALUATING PROGRESSIVE POWER LENS

The present application is a divisional application of U.S. patent application Ser. No. 12/920,784, filed on Sep. 2, 2010, which is in turn a National Stage entry of PCT/JP2009/066954, filed Sep. 29, 2009, the disclosures of all of which are hereby incorporated by reference.

TECHNICAL FIELD

The present invention relates to a progressive-power lens (progressive addition lens) in which pupil diameter is taken into consideration, which is a kind of multifocal spectacle lens having addition power for compensating for insufficient accommodation ability caused by presbyopia, a method of designing the progressive addition lens, and a method of evaluating the progressive addition lens.

BACKGROUND ART

A progressive addition lens is widely used in general due to its advantages such as that it is not easily recognized as a presbyopia spectacle lens from appearance although it actually is, and that it allows a wearer to clearly look continuously from a far distance to a near distance without discontinuity.

However, it is difficult to design a progressive addition lens because it is necessary to arrange a plurality of visual fields within a limited lens area without interposing a boundary between the plurality of visual fields, the plurality of visual fields being: a visual field for viewing far distance, a visual field for viewing near distance, and a visual field for viewing medium distance. For this reason, it is widely known that the progressive addition lens has its particular disadvantages such as that each visual field is not always sufficiently wide, and that there is a region mainly in a side visual field which causes the wearer to feel distortion or sway of an image.

To overcome these disadvantages, many prior arts have been proposed since long time ago. However, most of these prior arts are related to design technique for obtaining more preferred power distribution or astigmatism distribution depending on individual prescribed power and wear state, and relatively few of these prior arts are made to improve binocular vision of right and left eyes (see Patent Document 1 to 4).

Herein, the term "to improve binocular vision of right and left eyes" mainly means suitably arranging a near region and an intermediate region to obtain good binocular near vision and binocular intermediate vision.

In the aforesaid prior arts, the art disclosed in Patent Document 1 is a technique in which one sides of two kinds of lenses having bilaterally symmetric design are replaced with each other to form a lens having bilaterally asymmetric design, and the lens is rotated by about 10° due to convergence of near vision and set into a frame so that the astigmatism distribution in horizontal direction is bilaterally symmetrical. Further, the art disclosed in Patent Document 2 is a technique relating to design of a progressive addition lens in which the near vision region is bilaterally symmetric about the principal line of vision. Further, the art disclosed in Patent Document 3 is a technique relating to design of a progressive addition lens in which the astigmatism distribution of the near vision region is bilaterally asymmetric about the principal line of vision, in which the astigmatism distribution is denser on the nose side and thinner on the ear side. Further, the art disclosed in Patent Document 4 is a technique relating to a progressive addition lens in which the distortion of the near vision region in vertical direction is bilaterally asymmetric about the principal line of vision, in which the distortion is greater on the nose side and smaller on the ear side.

PRIOR ART DOCUMENTS

Patent Documents

[Patent Document 1] Japanese published examined application No. 49-3595
[Patent Document 2] Japanese Unexamined Patent Application Publication No. 57-10113
[Patent Document 3] Japanese published examined application No. H1-5682
[Patent Document 4] Japanese Unexamined Patent Application Publication No. H3-230114
[Patent Document 5] Japanese Unexamined Patent Application Publication No. H2-216428

DISCLOSURE OF THE INVENTION

Problems to be Solved by the Invention

Generally, when the wearer of the spectacle lens moves the line-of-sight to view the front near distance from viewing the front far distance, the line-of-sight of both eyes gradually moves inward to the target to be viewed at near distance. This function of the eye is widely known as the convergence function. To match the convergence function, generally the near region of the progressive addition lens is displaced from the distant region, which is adapted to view the front far distance, toward the nose side in the horizontal direction. Such a displacement is called an "amount of inward movement of line-of-sight".

In the aforesaid Patent Documents 1 to 4, a principal line of vision of the progressive addition lens extending vertically from the front distance vision toward the front near vision is determined, the principal line of vision is treated as a design principal meridian, and the power progressively changes from the distance power to the near power along the principal meridian. Since the position of the front near vision is displaced toward the nose side in the horizontal direction due to the aforesaid convergence function of the eye, the principal meridian is a curve that curves toward the nose side from the distant region to the near region. In other words, in the aforesaid Patent Documents 1 to 4, the principal line of vision through which the line-of-sight passes and the design principal meridian are regarded as the same.

However, when the wearer of the progressive addition lens moves the line-of-sight to view the front near distance from viewing the front far distance, the optical state along the principal line of vision through which the line-of-sight passes is not necessarily in the good optical state intended when designing. Particularly, there is a case where the displacement of the position at which the optical state of the front near vision becomes best (i.e., the amount of design inward movement set based on the pupillary distance of the wearer and the objective distance) is smaller than the amount of inward movement of line-of-sight, and therefore the binocular vision function is impaired.

Further, there is a case where, when evaluating the progressive addition lens with the lens meter after the lens is designed and trial-produced, the measured amount of inward movement fails reaching the amount of inward movement of line-of-sight, and therefore the lens is measured in a state where the amount of inward movement is insufficient. While dealing with this problem, the inventor of the present invention realized that the optical characteristic value measured by, for example, the lens meter (as a measuring device) and the optical characteristic value obtained by performing secondary calculation using the measured value are affected by the value of the area of the opening diameter (typically about 6φ to 10φ) of the lens meter.

Examples of the method of calculating the optical characteristic value with the lens meter include, for example, the method disclosed in Patent Document 5 in which the opening diameter is 6φ, for example, and four or more measurement points, each spaced apart from each other by a predetermined interval, are set within the area of 6φ, and the refractive power calculated based on the refractive state of these measurement points is regarded as the average refractive power within the opening diameter. In such case, unless the power distribution is completely uniform, a deviation will be actually generated on the measured refractive power depending on the value of the opening diameter, i.e., depending on the width of the mutual distance between the four or more measurement points.

Thus, when measuring the average power and the astigmatism, in the case where the opening diameter of the lens meter is relatively large and therefore the deviation is relatively large, the influence of such deviation will become nonnegligible. On the other hand, in the case where the opening diameter of the lens meter is small, the influence of such deviation will become small. Thus, when evaluating or using the measured value, it is necessary to consider the influence of the opening diameter of the lens meter on the measured value. In other words, when producing the progressive addition lens, it is necessary to consider the influence of the lens meter in both the design step and the production step.

In view of the aforesaid problems, it is an object of the present invention to improve the optical state of the progressive addition lens along the principal line of vision through which the line-of-sight of the wearer passes by making the displacement of a position at which the optical state of particularly the front near vision becomes the best to be the same as the amount of inward movement of line-of-sight, when the wearer moves his (or her) line-of-sight from the front far distance to the front near distance.

Further, it is another object of the present invention to suitably evaluate the progressive addition lens by considering the influence of the measuring device such as the lens meter or the like.

Means for Solving the Problems

To solve the aforesaid problems, a method of designing a progressive addition lens according to an aspect of the present invention is a method in which an expression $$OI<DH$$

is satisfied when: an intersecting line of a line-of-sight of a wearer of the progressive addition lens from a distance vision to a near vision and a refractive surface of the progressive addition lens is defined as a principal line of vision L; in the principal line of vision, a position corresponding to a front distance vision of the wearer of the progressive addition lens and a position corresponding to a front near vision of the wearer of the progressive addition lens are respectively defined as a point F and a point ON; a displacement of the point ON from the point F toward the nose side in the horizontal direction is defined as an amount of inward movement of line-of-sight OI; an intersection of a profile curve in horizontal direction H and a principal meridian curve M on the refractive surface of the progressive addition lens is defined as a point DN, in which the profile curve in horizontal direction H passes through the point ON in the principal line of vision, and the principal meridian curve M passes through the point F of the front distance vision and has an interval where power progressively changes from an upper portion toward a lower portion of the progressive addition lens; a displacement of the point DN of the design principal meridian curve M from the point F of the front distance vision toward the nose side in the horizontal direction is defined as an amount of design inward movement DH.

Further, a progressive addition lens according to another aspect of the present invention is a lens in which an amount of design inward movement DH is greater than an amount of inward movement of line-of-sight OI, when: in a refractive surface of the progressive addition lens, a principal meridian curve M passing through a point F of a front distance vision and having an interval where power progressively changes from an upper portion toward a lower portion of the progressive addition lens is set, and a displacement of a point DN of the design principal meridian curve M from the point F of the front distance vision toward the nose side in the horizontal direction is defined as the amount of design inward movement DH, an intersecting line of a line-of-sight of the progressive addition lens from a distance vision to a near vision and the refractive surface of the progressive addition lens is defined as a principal line of vision L, and a displacement of a point ON of a front near vision of the principal line of vision from the point F of the front distance vision toward the nose side in the horizontal direction is defined as the amount of inward movement of line-of-sight OI.

In the progressive addition lens and the design method thereof according to the present invention, the relation of the "amount of design inward movement DH" and the "amount of inward movement of line-of-sight OI", which were confused with each other in the conventional progressive addition lens, is individually considered, particularly the relation of the both is OI<DH. Thus, by more greatly displacing the amount of design inward movement DH, as a value greater than the amount of inward movement of line-of-sight OI instead of being treated as the amount of inward movement of line-of-sight OI, from the point F toward the nose side in the horizontal, it is possible to bring a position at which the refractive power reaches the maximum peak or a position at which the astigmatism distribution reaches the minimum peak (for example, zero) in the profile curve in horizontal direction H, which passes through the point ON, close a position where the amount of inward movement of line-of-sight becomes OI, in the case where the average power or astigmatism is smoothed within a range of a pupil diameter for example.

Further, it is preferred that the method of designing the progressive addition lens according to the aforesaid aspect of the present invention includes the steps of: setting the amount of inward movement of line-of-sight OI and the pupil diameter E; performing smoothing processing on the average power distribution and the astigmatism distribution within the area of the pupil diameter E; calculating the amount of inward movement VH of the peak position VN of the smoothed average power or the smoothed astigmatism and obtaining an error of inward movement based on the difference (VH-OI) between the amount of inward movement VH and the amount of design inward movement DH; and repeatedly performing calculation by changing the value of the amount of design inward movement DH until the absolute value of the amount of error of inward movement (VH-OI) is within a predetermined threshold, so that the amount of inward movement VH becomes close to the amount of inward movement of line-of-sight OI.

By including the aforesaid steps, the amount of inward movement VH of the peak position VN corresponding to the peak value in the smoothed average power distribution or the peak value in the smoothed astigmatism distribution (the peak value is the minimum value in the case of the astigmatism distribution) can be reliably brought close to the amount of inward movement of line-of-sight OI by relatively simple calculation method, so that the difference between the amount of inward movement VH and the amount of inward movement of line-of-sight OI does not exceed the predetermined threshold.

Further, a method according to further another aspect of the present invention is a method for evaluating a progressive addition lens which is designed so that at least one of an average power distribution and an astigmatism distribution is bilaterally asymmetrical in the horizontal direction with a design principal meridian curve as a boundary, the method comprising: taking into consideration of an error caused by smoothing the average power distribution or the astigmatism distribution within a measurement range of a lens meter between an amount of inward movement, as a target value, at a position corresponding to a front near vision and an inspected value of the lens meter, correcting an error of an inspection position where the amount of inward movement is inspected by the lens meter, and evaluating the amount of inward movement at the corrected inspection position.

Further, a method according to further another aspect of the present invention is a method for evaluating a progressive addition lens which is designed so that at least one of an average power distribution and an astigmatism distribution is bilaterally asymmetrical in the horizontal direction with a design principal meridian curve as a boundary, the method comprising: taking into consideration of an error caused by smoothing the average power distribution or the astigmatism distribution within a measurement range of a lens meter between an amount of inward movement, as a target value, at a position corresponding to a front near vision and an inspected value of the amount of inward movement obtained by the lens meter, correcting an error of the inspected value of the amount of inward movement obtained by the lens meter, and evaluating the amount of inward movement based on the corrected inspected value.

Thus, by previously correcting the error of the inspection position where the amount of inward movement is inspected by the lens meter and evaluating the amount of inward movement at the corrected inspection position, it is possible to avoid detecting unnecessary error of the amount of inward movement caused by the opening diameter of the lens meter and therefore more suitably perform evaluation of the amount of inward movement.

Incidentally, the lens meter mentioned in the specification and claims 9 to 12 of the present invention collectively means very kinds of measuring devices used for measuring refractive value of the lens.

Advantages of the Invention

With the progressive addition lens and the design method thereof according to the present invention, by individually considering the design principal meridian curve and the principal line of vision when the wearer actually moves the line-of-sight, it is possible to design the progressive addition lens so as to obtain an amount of inward movement of line-of-sight as intended as designed. To be specific, by setting an amount of design inward movement which is greater than the amount of inward movement of line-of-sight intended when designing, it is possible to obtain an amount of inward movement of line-of-sight as intended as designed, and therefore it is possible to provide spectacles which are less likely to impede binocular vision.

Further, with the progressive addition lens and the design method thereof according to the present invention, it is possible to consider the influence of the lens meter and suitably evaluate the progressive addition lens.

BRIEF DESCRIPTION OF DRAWINGS

FIG. 9 is a flowchart for explaining a method of designing the progressive addition lens according to the present invention;

BEST MODES FOR CARRYING OUT THE INVENTION

Embodiments of the present invention will be described below, however it should be understood that the present invention is not limited to these embodiments. The description will be made in the following order:

[1] Embodiment of Progressive Addition Lens and Embodiment of Design Method of Progressive Addition Lens (1) Description of Principle of Design Method of Progressive Addition Lens (2) Description of Progressive Addition Lens having Horizontally Asymmetric Design (3) Embodiment of Progressive Addition Lens (4) Flowchart of Design Method of Progressive Addition Lens

[2] Embodiment of Evaluation Method for Progressive Addition Lens

[1] Embodiment of Progressive Addition Lens and Embodiment of Design Method for Progressive Addition Lens (1) Description of Principle of Design Method of Progressive Addition Lens Before describing the embodiments of the present invention, as a premise thereof, the terms and positional relation necessary for describing the progressive addition lens will be clearly defined with reference to the attached drawings.

Figure 1:
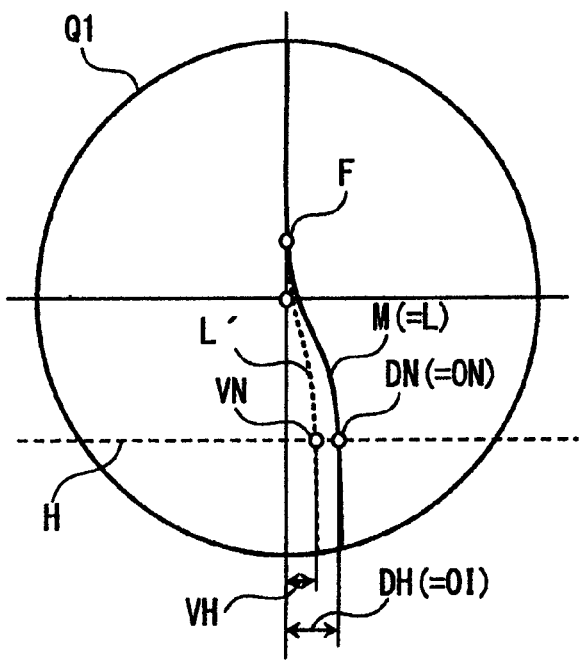
FIG. 1 is a front view of a progressive addition lens for right eye.

FIG. 1 is a front view showing a progressive addition lens Q1 for right eye when viewed from a convex side, and is made for explaining the principle of the present invention. In FIG. 1, the intersecting line of a line-of-sight of a wearer of the progressive addition lens Q ranging from a distance vision to a near vision and a refractive surface of the progressive addition lens Q1 is called "principal line of vision" L. Incidentally, the "line-of-sight" here is defined as a line with no width, and the principal line of vision L is a movement locus of an intersection of the line of vision of the wearer and the lens surface plotted by moving the eye up and down when the pupil is considered as a point. In other words, the principal line of vision L is defined as a curve without considering the pupil diameter. Further, the position of front distance vision in the principal line of vision is a point F, and the position of front near vision in the principal line of vision is a point ON.

Here, the point ON is displaced from the point F toward the nose side in the horizontal direction, and such displacement OI is called "amount of inward movement of line-of-sight". The amount of inward movement of line-of-sight OI is optically designed based on the pupillary distance of the wearer of the progressive addition lens and an objective distance (an near vision objective distance defined by a client, i.e., the wearer of the spectacles, a spectacles store, a lens manufacturer or the like) so that the best visual acuity of the near vision (or the best visual acuity of a particular usage) can be obtained.

Further, there is a "design principal meridian curve" M on the refractive surface of the progressive addition lens Q1, wherein the curve M passes through the point F and has an interval along which the power progressively changes from an upper portion toward a lower portion of the lens. In the curve M, a point having a height corresponding to the near vision (i.e., an intersection of a profile curve H in horizontal direction, which passes through the point ON, and the curve M) is called a "point DN". At this time, a point DH is displaced from the point F toward the nose side in the horizontal direction, and such displacement is called "amount of design inward movement".

In other words, it can be said that the "principal line of vision" L is a curve through which the line-of-sight passes while the vision of the wearer of the spectacles is changed from the front distance vision to the front near vision, and the "design principal meridian curve" M is a design reference curve for providing change of the progressive-power.

In the aforesaid prior arts, the aforesaid two curves L and M are treated as the same without distinction. In other words, the "principal line of vision" L is simply regarded as the "design principal meridian curve" M for providing change of the progressive-power, or change of the progressive-power is provided along the "design principal meridian curve" M, and righteously the curve M is treated as the "principal line of vision" L.

Incidentally, since the refractive surface of the progressive addition lens includes a refractive surface on object side and a refractive surface on eye side, the refractive surface having the "principal line of vision" L and "design principal meridian curve" M also includes two types of refractive surfaces, which are a front type refractive surface and a rear type refractive surface.

Further, change of the progressive-power along the "principal line of vision" L and the "design principal meridian curve" M includes two cases, which are a case where the change of the progressive-power is the change of the surface refractive power (in the case of a single-surface progressive addition lens), and a case where the change of the progressive-power is the change of the refractive power transmitted through the lens (in the case of a both-surface progressive-addition lens).

Although the after-mentioned embodiments are described mainly based on a case where the surface refractive power on the object side changes, it should be understood that the present invention may also be applied to a case where the surface refractive power on the eye side changes and a case where the transmitted refractive power changes, and the progressive addition lens, the after-mentioned design method of the progressive addition lens and the evaluation method according to the present invention include all these cases.

Furthermore, although the positions of the "principal line of vision" L and the "design principal meridian curve" M in a range from the front distance vision to the upward portion and a range from the front near vision to the downward portion have not been defined in the above description, it is considered that all these curves substantially extend up and down as shown in FIG. 1 for the sake of convenience.

Figure 2:
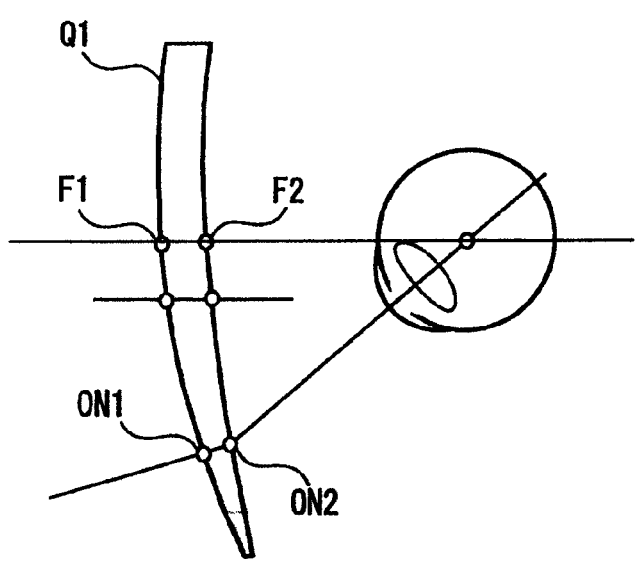
FIG. 2 is a cross section of the progressive addition lens shown in FIG. 1 when viewed from the lateral side.

FIG. 2 is a cross section of the progressive addition lens Q1 shown in FIG. 1 when viewed from the lateral side. FIG. 2 shows that the vertical position of the point F and point ON changes depending on whether the refractive surface, on which the "principal line of vision" L and the "design principal meridian curve" M exist, is on the object side or on the eye side. The last number "1" of the reference numerals of FIG. 2 represents the case where the refractive surface, on which the point F and point ON are set, is on the object side, and the last number "2" represents the case where the refractive surface is on the eye side.

In each of the aforesaid Patent Documents 1 to 4, the progressive addition lens is divided into two portions which are a nose side portion and an ear side portion, and the "principal line of vision", as a boundary of the two portions, is regarded as the same as the "design principal meridian curve". In these Patent Documents, in which the "design principal meridian curve" is regarded as a theoretical reference curve without width, there are not only examples where the optical property on the nose side and the optical property on the ear side are horizontally symmetrical with each other such as disclosed in Patent Documents 1 and 2, but also examples where the optical property on the nose side and the optical property on the ear side are horizontally asymmetrical with each other such as disclosed in Patent Documents 3 and 4.

In contrast, the inventor of the present invention thinks the "principal line of vision" is the intersecting line of the line-of-sight of the spectacles wearer and the lens surface, and treats the "principal line of vision" as different from the "design principal meridian curve". In other words, the "line-of-sight" is generally treated as a strait line without width, however the light incident into the eye along the line-of-sight is actually a light beam passed through the pupil diameter which has a diameter of about 2 mm to 8 mm. Thus, the "line-of-sight" may also be considered as a path of the light incident into the eye passed through the center of the pupil diameter.

Based on this point of view, in a progressive addition lens where the refractive power is horizontally asymmetrical with the "design principal meridian curve" as a boundary, since in the whole light beam passed through the pupil diameter, the half portion light beam on the nose side and the half portion light beam on the ear side have different the optical property, the averaged optical property of the whole light beam is different from the optical property of the light passed through the center of the pupil. Here, the disadvantages of the prior arts will be described below with reference to FIGS. 3A, 3B and 3C.

Figure 3:
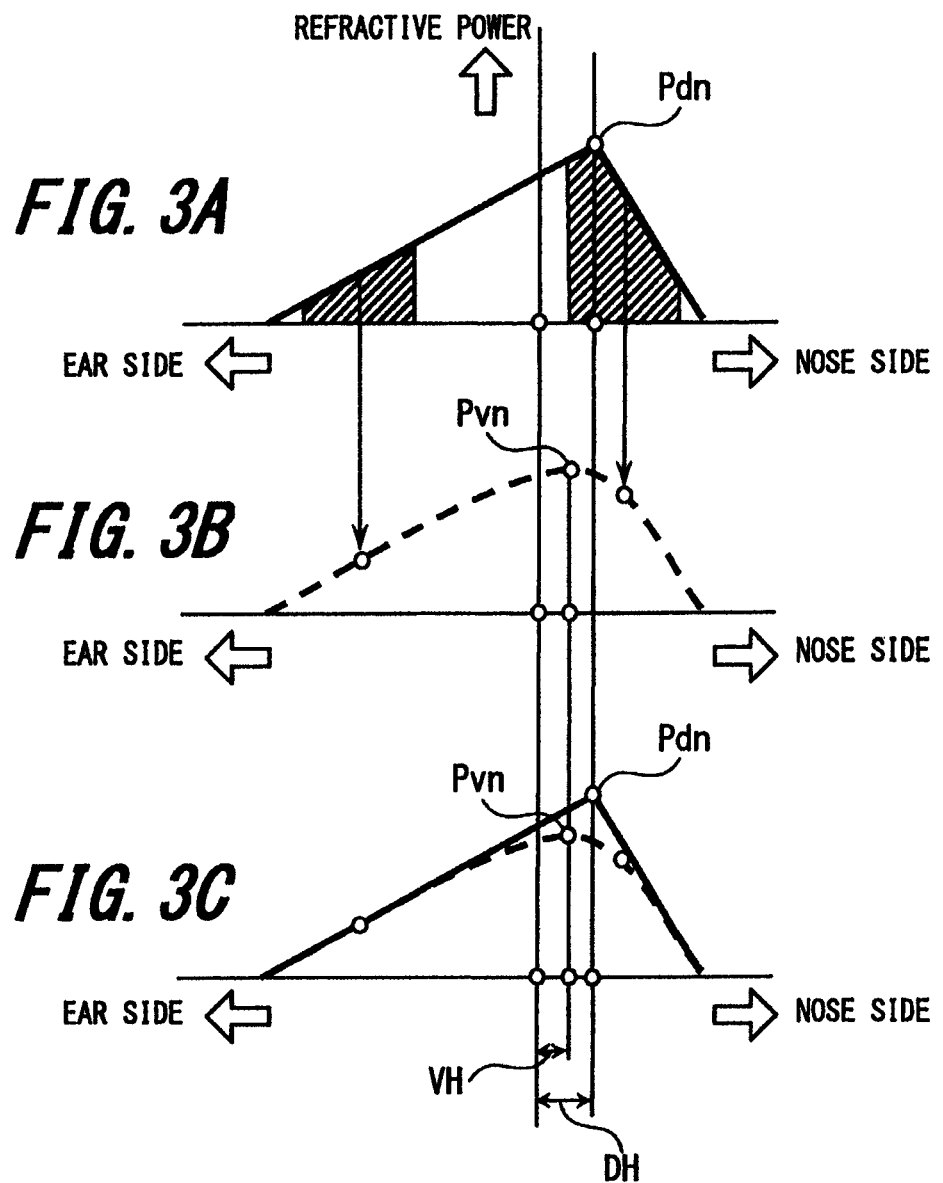
FIG. 3A is a graph showing a refractive power distribution along a profile curve in horizontal direction indicated by dotted line H shown in FIG. 1.
FIG. 3B is a graph showing a smoothed refractive power distribution obtained by averaging the refractive power distribution shown in FIG. 3A with the width of pupil diameter.
FIG. 3C is a graph obtained by superimposing the graph of FIG. 3A and the graph of FIG. 3B on each other.

FIGS. 3A, 3B and 3C are each a graph showing a refractive power distribution of average power along a profile curve H in horizontal direction indicated by a dotted line of FIG. 1. The profile curve H passes through the point ON in the "principal line of vision" and the point DN in the "design principal meridian curve" in the front near vision.

The solid line of FIG. 3A indicates the refractive power distribution itself along the profile curve H. As is known from FIG. 3A, the refractive power distribution along the profile curve H is an asymmetrical distribution in which the refractive power reaches Pdh, which is the peak, at the point DN in the "design principal meridian curve" and decreases more rapidly on the nose side than on the ear side with Pdh as a boundary.

FIG. 3B is a dotted line graph obtained by replacing the solid line graph of FIG. 3A by a smoothed refractive power distribution obtained by averaging the solid line graph with the width of the pupil diameter. The horizontal width of the hatched areas of FIG. 3A represents the pupil diameter, and the dotted line graph of FIG. 3B is obtained by transcribing the graph by using the average value of the hatched area as the value of the central position of the pupil diameter.

For example, since the refractive power in the left hatched area of FIG. 3A changes uniformly within the range of the pupil diameter, the value of the central position of the pupil diameter is equal to the average value of the hatched area (indicated by the leftmost open circle of FIG. 3B). Thus, it can be confirmed by viewing FIG. 3C, which is a graph obtained by superimposing the graph of FIG. 3A and the graph of FIG. 3B on each other, that the values of both graphs at this position have no difference.

However, the refractive power in the right hatched area of FIG. 3A does not change uniformly within the range of the pupil diameter. To be specific, with Pdh as the peak, since the refractive power on the both sides of Pdh is lower than Pdh, the average value of the hatched area (indicated by the rightmost open circle of FIG. 3B) is lower than the value of the central position of the pupil diameter. This can also be confirmed by viewing the graph of FIG. 3C.

Similarly, it can be confirmed that the value of Pvn, which is the peak of the dotted line graph of FIG. 3B, is lower than the value of Pdn, which is the peak of the solid line graph of FIG. 3A. This is a result of smoothing process which is achieved by averaging the graph with the width of the pupil diameter as mentioned above. Incidentally, in addition to the moving-average method with the width of the pupil diameter described above, the smoothing methods also include other methods such as a polynomial fitting method, a frequency-domain method and the like. All these methods share a common feature that, in order to smooth concavity and convexity of the graph, in the aforesaid comparison between the peak values, there is a tendency that Pdn>Pvn.

It should be noted that, in the case where the refractive power distribution along the profile curve H is asymmetrical between the ear side and the nose side with the refractive power Pdn at the point DN of the "design principal meridian curve" as a boundary, the displacement VH of Pvn is different from the displacement DH of Pdn.

In other words, as mentioned above, the solid line graph of FIG. 3A is an example in which the refractive power distribution along the profile curve H is an asymmetrical distribution in which the refractive power decreases more rapidly on the nose side than on the ear side with Pdh as a boundary. It can be known that, in the aforesaid asymmetrical distribution example, if moving the hatched area of FIG. 3A along the horizontal direction to complete the dotted line graph of FIG. 3B, for example, the position of Pvn will be closer to the center than the position of Pdn, and therefore VH<DH.

It is easy to presume that, in an example where the asymmetrical distribution corresponds to a graph inverted from the graph of FIG. 3A (i.e., in an example where the refractive power distribution along the profile curve H is an asymmetrical distribution in which the refractive power decreases more rapidly on the ear side than on the nose side with Pdh as a boundary), the position of Pvn will be closer to the nose side than the position of Pdn, and therefore VH>DH.

Further, the position of Pvn and the position of Pdn are the same and therefore VH=DH in the case where the refractive power distribution along the profile curve H is symmetrical with Pdn as a boundary.

Thus, in the aforesaid prior arts (Patent Documents 1 to 4), particularly in the horizontally asymmetrical prior arts with the "design principal meridian curve" as a boundary, it is impossible to obtain a correct predetermined "amount of inward movement of line-of-sight" as long as the "principal line of vision" and the "design principal meridian curve" are treated as the same.

For example, in the progressive addition lens Q1 for right eye as shown in FIG. 1, the details of the power detail are: spherical power S=+4.50, addition power Add=2.50, distance fitting point is F, and near addition power measurement point is DN. Herein, the point DN is displaced from the point F toward the nose side in the horizontal direction by DH that is equal to the predetermined "amount of inward movement of line-of-sight" OI, and in this example, OI=DH=4.0 mm.

However, in the example of FIG. 1, the refractive power distribution along the profile curve H in horizontal direction changes more rapidly in the range from the point DN to the nose side than in the range from the point DN to on the ear side, and therefore if the pupil diameter of the wearer of the lens is 6.0 mm, for example, the amount of inward movement VH of the peak Pvn of the average refractive power, which is obtained by averaging the refractive power with the width of the pupil diameter, will be 0.3 mm smaller than DH, i.e., VH=3.7 mm. Thus, it is impossible to obtain the correct predetermined "amount of inward movement of line-of-sight" OI.

Incidentally, although FIGS. 3A, 3B and 3C are made to explain the refractive power distribution, the astigmatism distribution can also be explained using these drawings. In the case where the drawings are used to explain the astigmatism distribution, the vertical axis will be the absolute value of the astigmatism, instead of being the refractive power. In such a case, the higher the vertical axis goes, the smaller the absolute value of the astigmatism becomes; and the lower the vertical axis goes, the greater the absolute value of the astigmatism becomes. In other words, the peak of each drawing represents a position where the absolute value of the astigmatism is the smallest.

A principal meridian where the minimum value of the absolute value of the astigmatism on the refractive power is zero is called an "umbilical principal meridian", however in the present invention, the existence of the "umbilical principal meridian" is not necessary, and a principal meridian where the astigmatism incident into the eye transmitted through the lens becomes the minimum value may be regarded as the "design principal meridian curve". In such a case, each graph in FIGS. 3A, 3B and 3C is treated as "transmission astigmatism", instead of surface astigmatism on the refractive surface.

(2) Description of Progressive Addition Lens Having Horizontally Asymmetric Design As described above, the advantages of the present invention can be achieved in the case where the lens is horizontally asymmetrical with the "design principal meridian curve" as a boundary. The horizontally asymmetric design, to which the present invention is applied, will be briefed below, and the reasons why the horizontally asymmetric design is beneficial for achieving good binocular vision will also be described below.

First, to achieve good binocular vision, it is necessary to make a position of the right lens through which the line-of-sight of the right eye passes have the same optical performance as a position of the left lens through which the line-of-sight of the left eye passes, wherein the optical performance includes astigmatism, axial direction of astigmatism, average refractive power (spherical power+half of cylindrical power), and horizontal component and vertical component of prism refractive power of the lens.

Here, in the case where the target to be viewed is moved from the front side toward the lateral side of the lens wearer, since the line-of-sight of one eye moves toward the ear side and the line-of-sight of the other eye moves toward the nose side, a position of the one lens through which the line-of-sight of the one eye passes will not necessarily have the same optical performance as a position of the other lens through which the line-of-sight of the other eye passes. If the target to be viewed is at an infinite distance from the lens wearer, since the deflection angle of the line-of-sight of the right eye and the deflection angle of the line-of-sight of the left eye are the same when the target to be viewed is moved from the front vision toward the side vision, it is preferred that the distribution of the optical performance of the lens is bilaterally mirror symmetric in the horizontal direction with the principal line of vision as a boundary (i.e., a symmetrical arrangement in which an image is reflected in a mirror disposed at the position of the principal line of vision).

On the other hand, if the target to be viewed is at a finite distance from the lens wearer, due to convergence, both the line-of-sight of the right eye and the line-of-sight of the left eye will be moved toward the nose side. In such state, when the target to be viewed is moved from the front vision toward the side vision, distance to the target to be viewed will become farther in great generality. If the distance to the target to be viewed becomes farther, the convergence of the eye will become smaller, and therefore the line-of-sights of both eyes will become more closely parallel with each other. Thus, if the target to be viewed is at a finite distance from the lens wearer, the deflection angle of the line-of-sights of the right eye and the deflection angle of the line-of-sights of the left eye will be different from each other when the target to be viewed is moved from the front vision toward the side vision, and the line-of-sight rotated toward the ear side will be more greatly deflected than the line-of-sight rotated toward the nose side. Due to the rotation of the head of the lens wearer in side vision (typically about half of the angle of movement from the front vision toward the side vision is achieved by rotating head, and the other half is achieved by rotating eye), such trend is further condensed in the spectacle lens that rotates concomitantly with the head, and therefore becomes prominent. Thus, to view the finite distance, it is preferred that the portion where the principal line of vision is displaced toward the nose side with the position of the point F as a reference is bilaterally asymmetrical in the horizontal direction. In a progressive addition lens, since the distribution of the optical performance of the lens from the principal line of vision toward the horizontal direction generally changes, it is preferred that optical performance changes more rapidly in the range from the principal line of vision toward the nose side than in the range from the principal line of vision toward the ear side so that the position of the right lens through which the line-of-sight of the right eye passes has the same optical performance as the position of the left lens through which the line-of-sight of the left eye passes.

It can be said by summarizing above description that, in one or all of the following five changes along the profile curve H in horizontal direction that intersects with the point ON of the "principal line of vision", it is preferred that the change is more rapid in the range from the point ON toward nose side than in the range from the point ON toward ear side.

1. Change of the astigmatism distribution
2. Change of the axial direction of astigmatism
3. Change of the average refractive power
4. Change of the horizontal component of prism refractive power
5. Change of the vertical component of prism refractive power The concrete implementation method to which the present invention is applied has no big difference from the conventional methods with respect to the horizontally asymmetric design, which is the subject of the present invention. The important thing is that the position of the "principal line of vision", by which the predetermined progressive effect is obtained, and the position of the "design principal meridian curve", which provides progressive effect on optical design, are different from each other. In other words, the result of the moving-average with the pupil diameter having a diameter of 2 mm to 8 mm can be obtained by estimating the "amount of design inward movement" DH, which is different from the "amount of inward movement of line-of-sight" OI, so that the "amount of design inward movement" DH becomes the predetermined "amount of inward movement of line-of-sight" OI.

Although it is possible to set up a relational expression between the amount of design inward movement DH and the amount of inward movement of line-of-sight OI, the simplest method is performing convergence calculation by means of iterative calculation. For example, assuming that the maximum difference between the amount of design inward movement DH and the amount of inward movement of line-of-sight OI is 5 mm and the final allowable error is ±0.05 mm, then the convergence ratio is 1/100, and convergence can be achieved by performing only seven times iterative calculations even by means of half-convergence calculation, which the simplest calculation.

(3) Embodiment of Progressive Addition Lens

Figure 4:
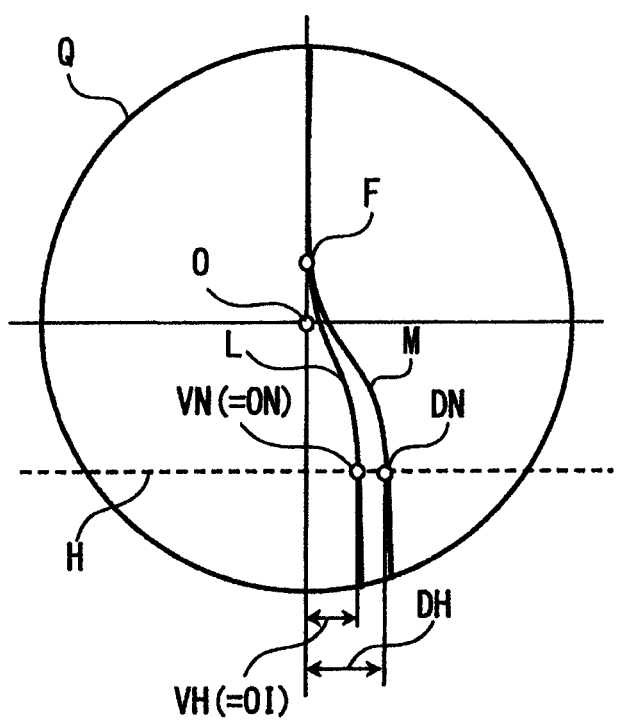
FIG. 4 is a front view of a progressive addition lens for right eye according to an embodiment of a progressive addition lens of the present invention.

An embodiment of the present invention will be described below with reference to FIG. 4. FIG. 4 is a front view of an example of the progressive addition lens Q according to the embodiment of the present invention. The details of the power of the progressive addition lens Q of the present example are, for example, spherical power S=+4.50, addition power Add=2.50; the distance fitting point is F; and the position located in the principal line of vision L, which passes through the point F, and corresponding to the front near vision is the point ON. Herein, the point ON is displaced from the distance fitting point F toward the nose side in the horizontal direction by the predetermined "amount of inward movement of line-of-sight" OI, and in the present example OI=4.0 mm.

Further, on the object side refractive surface of the progressive addition lens Q of the present example, there is a "design principal meridian curve" M which passes through the distance fitting point and along which the power progressively changes from the upper portion to the lower portion. Further, the point DN is at the "intersection of the design principal meridian curve" M and the profile curve in horizontal direction H that passes through the point ON. Incidentally, the point DN is displaced from the distance fitting point F toward the nose side in the horizontal direction by DH, and DH is greater than OI by design. In the present example, DH=4.3 mm.

In other words, in such a case, the refractive power distribution along the profile curve H in horizontal direction changes more rapidly in the range from the point DN to the nose side than in the range from the point DN to on the ear side, and the diameter of the pupil diameter of the wearer is 6.0 mm when the lens is actually worn by the wearer. Thus, in order to make the amount of inward movement VH of the point VN (which is the peak position of the smoothed distribution within the pupil diameter) become the predetermined amount of inward movement (i.e., the "amount of inward movement of line-of-sight" OI=4.0 mm, in the best optical state), the relation between the "amount of design inward movement" DH and the "amount of inward movement of line-of-sight" OI is estimated by performing convergence calculation by means of iterative calculation. Further, based on the estimated result, it is calculated that the "amount of design inward movement" DH should be DH=4.3 mm in this case, which is 0.3 mm greater than the predetermined "amount of inward movement of line-of-sight" OI=4.0 mm.

Figure 5:
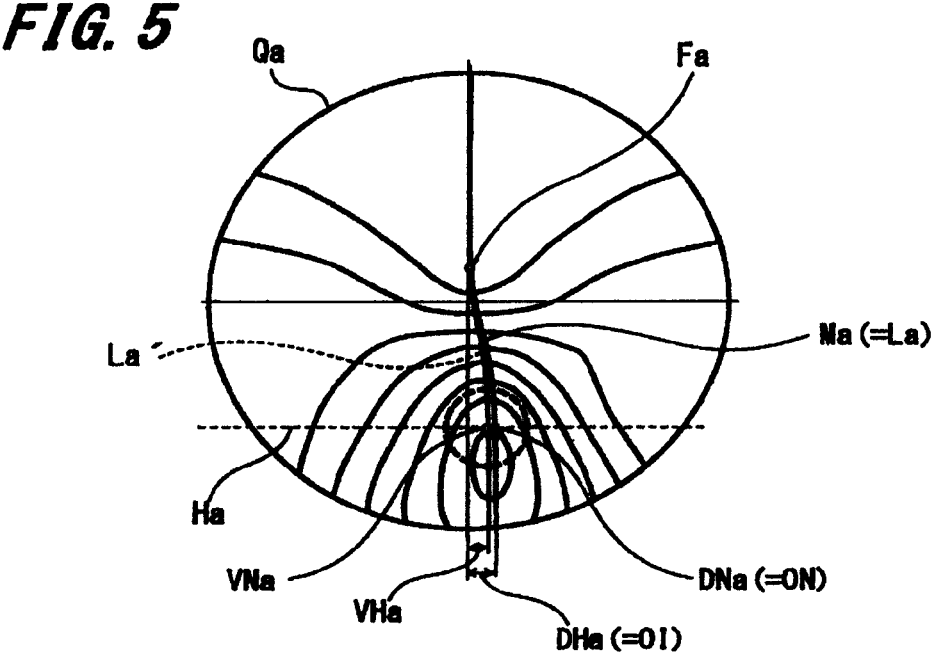
FIG. 5 is a view showing an example of an average power distribution of a progressive addition lens according to a prior art.
Figure 6:
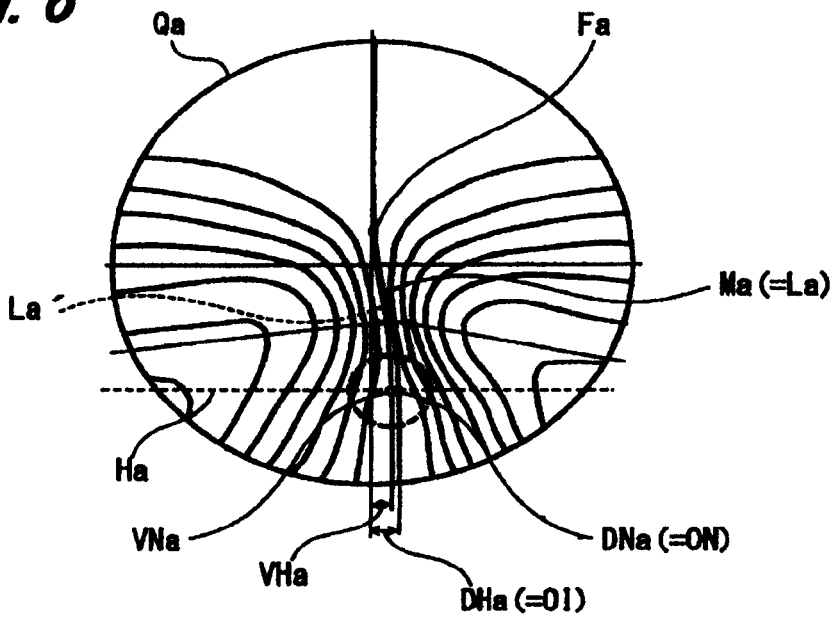
FIG. 6 is a view showing an example of an astigmatism distribution of the progressive addition lens according to the prior art.

FIG. 5 is a view showing an average power distribution of a progressive addition lens for right eye according to a prior art, and FIG. 6 is a view showing an astigmatism distribution of the progressive addition lens for right eye according to the prior art, the drawings being plotted as a comparison with the embodiment of the present invention. In this example, similar to the example described with reference to FIG. 1, the details of the power are: spherical power S=+4.50, addition power Add=2.50, and OI=DH=4.0 mm.

As is known from FIGS. 5 and 6 that, an intersection DNa of a profile curve Ha in horizontal direction (corresponding to the profile curve H of FIG. 1) and a "design principal meridian curve" Ma is displaced from a front distance vision Fa toward the nose side in the horizontal direction by a predetermined "amount of design inward movement" DHa, and an amount of inward movement of a point VNa (which is the peak of the average refractive power distribution obtained by smoothing the refractive power distribution with the width of the pupil diameter in the case where the diameter of the pupil diameter is 6.0 mm) is VHa=3.7 mm, which is smaller than DHa, so that amount of the inward movement is insufficient.

Incidentally, the small circle plotted by the dotted line in the near portion indicates the pupil diameter in the both drawings. Since the contour distribution of the average power and the contour distribution of the astigmatism are not displaced in the horizontal direction, it is possible to presumed that, at the position VNa indicated by the open circle at the center of the small circle, the average refractive power along the profile curve Ha in horizontal direction reaches the maximum value and the astigmatism reaches the minimum value. In other words, the position VNa in the near vision is the actual center when viewing near distance through the pupil diameter, and the amount of inward movement VHa of VNa is smaller than the predetermined position DHa, which is indicated by the filled circle, so that it is obvious that the amount of the inward movement is insufficient.

Figure 7:
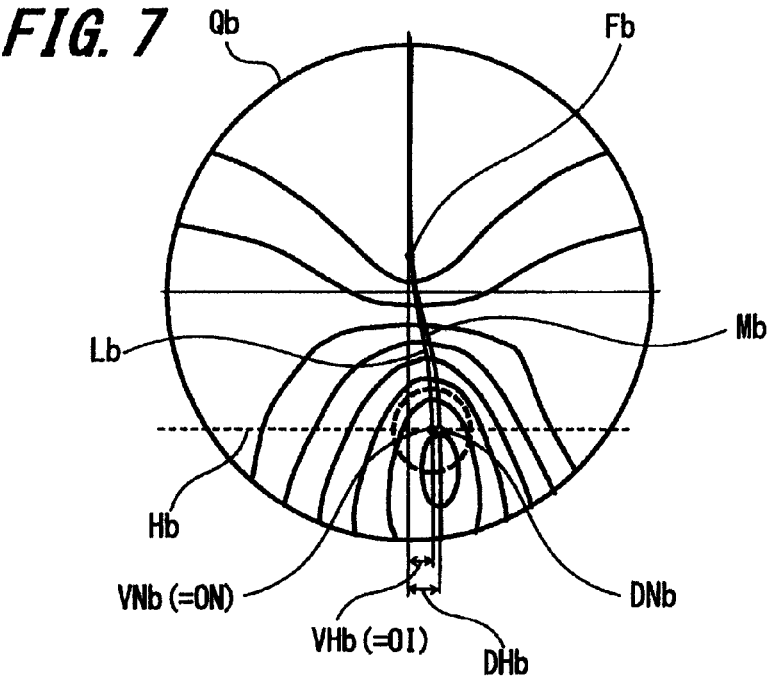
FIG. 7 is a view showing an example of an average power distribution of the progressive addition lens according to the embodiment of the present invention.
Figure 8:
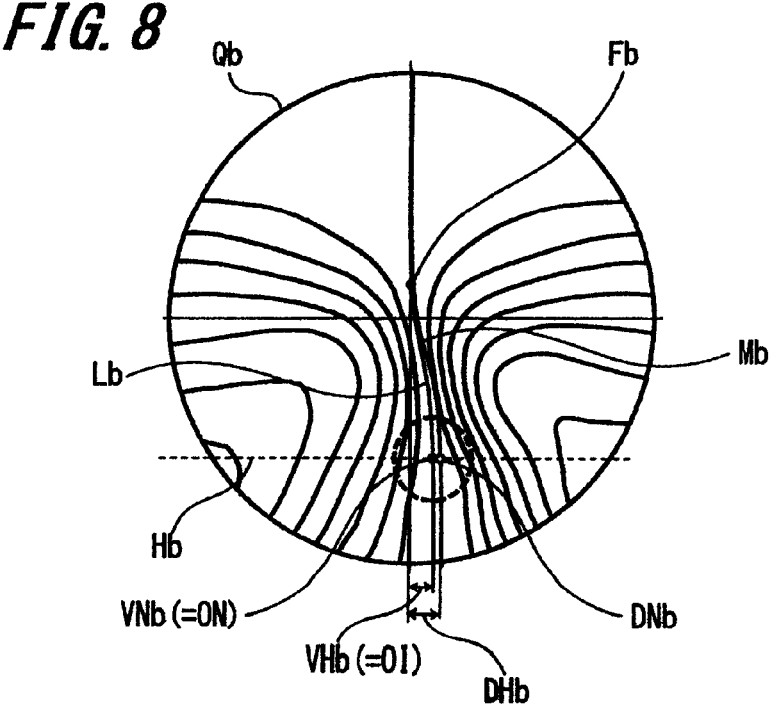
FIG. 8 is a view showing an example of an astigmatism distribution of the progressive addition lens according to the embodiment of the present invention.

FIG. 7 is a view showing an average power distribution of the progressive addition lens for right eye of the aforesaid embodiment of the present invention, and FIG. 8 is a view showing an astigmatism distribution of the progressive addition lens for right eye of the aforesaid embodiment of the present invention. In this example, similar to the example described with reference to FIG. 4, the details of the power are: spherical power S=+4.50, addition power Add=2.50, and OI=4.0 mm, but the amount of design inward movement DH is greater than OI.

As shown in FIGS. 7 and 8, in the progressive addition lens Qb, an intersection DNb of a "design principal meridian curve" Mb and a profile curve Hb in the horizontal direction (corresponding to the profile curve Ha of FIGS. 5 and 6) is displaced from a front distance vision Fb toward the nose side in the horizontal direction by DHb, which is slightly greater than DHa. In other words, DHb=4.3 mm, and DHb>OI in this case. At this time, when the point which represents the peak of the average refractive power distribution obtained by smoothing the refractive power distribution with the width of the pupil diameter is a point VNb indicated by the filled circle in the case where the diameter of the pupil diameter is 6.0 mm, the point VNb is correctly displaced from the distance vision position Fb toward the nose side in the horizontal direction by a predetermined "amount of inward movement of line-of-sight" VHb (=OI=DHa), and conversely the "amount of design inward movement" DHb, which is the position of DNb indicated by the open circle, is greater than VHb. Thus, in the present embodiment shown in FIGS. 7 and 8, the amount of inward movement of line-of-sight VHb is correctly obtained.

(4) Flowchart of Design Method of Progressive Addition Lens

FIG. 9 is a flowchart for explaining a design method of the asymmetrical progressive addition lens according to the present invention. As shown in FIG. 9, when staring the design of the progressive addition lens of the present invention, a targeted amount of inward movement of line-of-sight OI and pupil diameter E are set first (Step S1). Next, the amount of inward movement of line-of-sight OI is substituted as initial value of the amount of design inward movement DH (Step S2). Thereafter, the average power distribution and the astigmatism distribution of the lens designed by the aforesaid setting are obtained (Step S3). Thereafter, by performing smoothing processing on the obtained average power distribution and astigmatism distribution in the area of the pupil diameter E, a new average power distribution and a new astigmatism distribution are obtained (Step S4).

Next, the amount of inward movement VH of the peak position VN of the smoothed average power or the smoothed astigmatism, which are smoothed along the profile curve H in horizontal direction passing through the point ON corresponding to the front near vision, is obtained (Step S5), and further the difference (VH−OI), which represents the error of inward movement, is obtained (Step S6). Thereafter, it is judged whether or not the absolute value of the error, i.e., the absolute value of (VH−OI), is within a threshold of 0.05 mm (Step S7). If the absolute value of the error is less than the threshold, then it is judged that the amount of inward movement of line-of-sight VH substantially converges at the predetermined amount of inward movement OI, and therefore the processing is completed. If the absolute value of the error is equal to or greater than the threshold, then half (½) of the "error of inward movement" (VH−OI) obtained in Step S6 is subtracted from the "amount of design inward movement" DH obtained in Step S2 to obtain a new "amount of design inward movement" DH. In other words, the processing is returned to Step S3 to perform convergence calculation, by means of iterative calculation with a new amount of design inward movement of DH=DH−(VH−OI)/2 (Step S8).

Incidentally, the reason why the amount subtracted from the amount of design inward movement DH in Step S8 is half of the "error of inward movement" instead of being the whole "error of inward movement" is because it is desirable to avoid the possibility that the error might be increased when performing the recalculation and therefore the calculation might diverge instead of converging. Further, since the seventh power of ½ is equal to $1/128$, it is anticipated that at least the error can be made equal to or less than $1/128$ by repeating at most 7 times iterative calculations, and therefore the absolute value of the error can be made smaller than the threshold in a relatively short time.

As described below, by using the aforesaid design method of the progressive addition lens, impairment of binocular vision function can be suppressed.

The binocular vision function originally means highly sophisticated function such as simultaneous vision, stereoscopic vision and fusion owned by a visual system including the brain, instead of being a function owned by spectacles or spectacle lens. However, all these functions such as simultaneous vision, stereoscopic vision and fusion are based on the premise of good binocular vision, and it is obvious that the use of spectacles to impede binocular vision will result in impairment of the binocular vision function.

In other words, the advantage of the present invention is that the relation of the "amount of design inward movement" and the "amount of inward movement of line-of-sight", which were confused with each other according to the prior arts, is made clear, and as a result, the method of obtaining a correct predetermined "amount of inward movement of line-of-sight" becomes clear, so that it becomes possible to provide spectacles which are less likely to impede binocular vision.

[2] Embodiment of Evaluation Method for Progressive Addition Lens

Next, an embodiment of evaluation method for progressive addition lens according to the present invention will be described below. The evaluation of the optical characteristics (such as power, refractive power distribution state, layout position and the like) of the progressive addition lens is performed after the lens is designed and then trial-produced according to the design. To be specific, as the flow of a typical production process of the progressive addition lens, the lens is designed first. In the designing step, when determining the arrangement of the design principal meridian curve, the amount of inward movement is determined and laid out on the lens.

Further, while the processing is transferred from the designing step to the production step, there is a trial production step in which it is necessary to verify whether or not the production of the lens is performed according to the design. The verification of the lens is performed using a lens meter, such as the one described in the aforesaid Patent Document 5 and the like, to check whether the value at each of preset check points (inspection positions) meets the design requirements. The amount of inward movement is also checked using these methods in which the lens meter is placed on the designated inward movement position to verify whether the position has a design optical value (inspected value).

However, as described above, the measured value obtained by the lens meter is an average value within the opening diameter of the lens meter (although average calculation method is different depending on the lens meter), the opening diameter of the lens meter will have influence particularly on the measurement of the amount of inward movement. To be specific, similar to the smoothing process in the area within the pupil diameter described with reference to FIGS. 3A, 3B and 3C, there is an average refractive power as a result of performing averaging process within the area of the opening diameter of the lens meter, and in a progressive addition lens having horizontally asymmetric design, the peak position where the average refractive power reaches the peak is displaced toward a side where change of the refractive power distribution is thinner, typically the ear side (the temple side). In other words, if the position where the average refractive power within the opening diameter of the lens meter reaches the peak is a measurement position MN, then an amount of inward movement MH of the measurement position MN will be smaller than the amount of inward movement DH of the point DN that is the intersection of design principal meridian curve M and the profile curve H.

Conventionally, even in the case where wrong verification result is caused due to the influence of the measurement error of such measuring device although the processing of the lens is actually performed according to the design, the evaluation is performed based on the measured value without considering the influence of the measurement error of the measuring device. Thus, if the amount of inward movement is revised (corrected) according to the measured value itself of the measuring device, there will arise a problem that the amount of inward movement might be different from the amount of design inward movement.

In other words, since the position of the design principal meridian curve obtained based on the measured data is not correctly grasped due to the influence of the opening diameter of the lens meter (i.e., the measuring device), as a result the position of the best optical state of front near vision for the wearer is displaced.

In contrast, in the present invention, since the measurement position on the lens is selected taking into consideration of the influence of the opening diameter of the lens meter, it is possible to avoid wrong correction to the amount of inward movement caused by the aforesaid error of the measuring device.

Figure 10A:
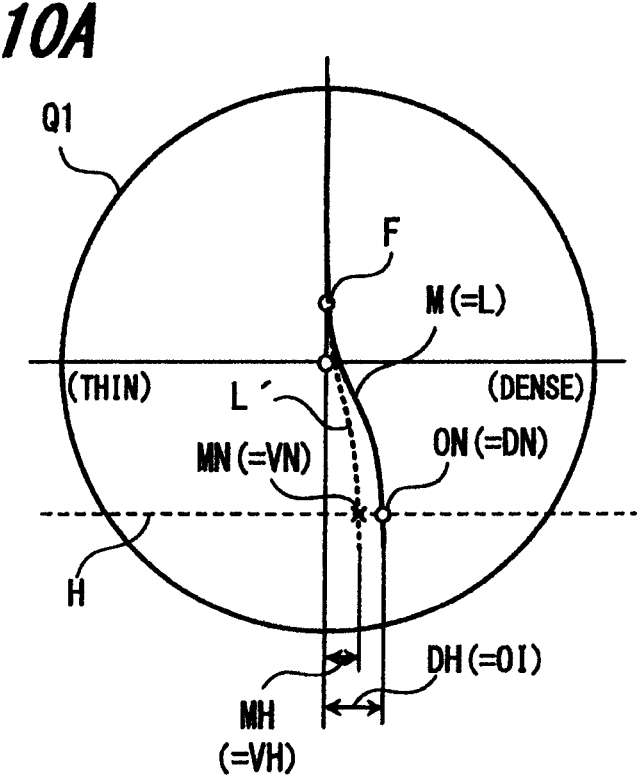
FIG. 10A is a front view of a progressive addition lens for right eye made for explaining a method for evaluating the progressive addition lens according to the present invention.
Figure 10B:
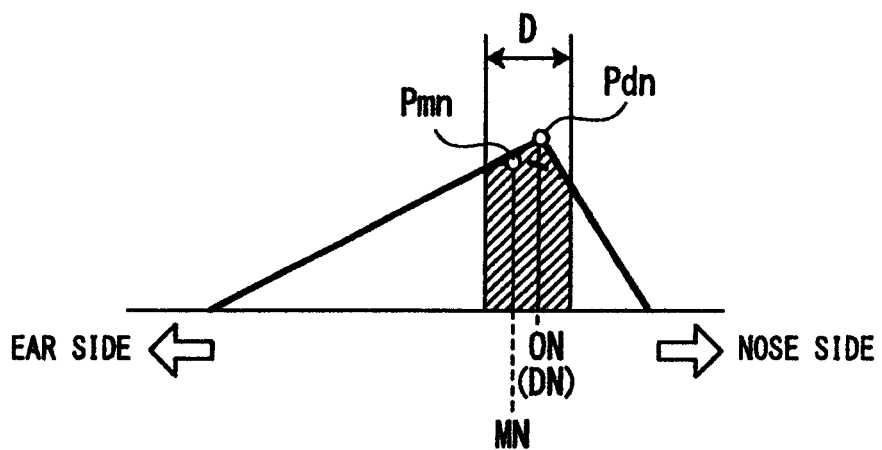
FIG. 10B is a graph showing a refractive power distribution of average power of the progressive addition lens for right eye shown in FIG. 10A.

First, a case where the measurement is performed on a conventional progressive addition lens will be described below with reference to FIGS. 10A and 10B. FIG. 10A is made for explaining the measurement position when evaluating the optical characteristics of a progressive addition lens Q1, and is a front view of the progressive addition lens for right eye. The progressive addition lens Q1 has the same configuration as the progressive addition lens for right eye Q1 described with reference to FIG. 1, in which a principal line of vision L and a design principal meridian curve M are the same. As shown in FIG. 10B, a refractive power distribution of the average power along the profile curve H in horizontal direction, which passes through a point ON which is a position corresponding to the front near vision of the principal line of vision L, is denser on the nose side and thinner on the ear side with a peak value Pdn at the point ON (=DN) as a boundary. Here, in the case where the opening diameter D of the lens meter is, for example, 8 mm, the averaged distribution in this range (i.e., in the hatched area in FIG. 10B) is indicated by a dashed line shown in FIG. 10B, and a peak value Pmn of the averaged distribution is lower than the design peak value Pdn, and further, the point MN, which is a position in the profile curve H corresponding to the peak value Pmn of the averaged distribution, is at a position displaced from the point ON toward the ear side. Thus, the point MN can be selected as the measurement position of the lens meter having the opening diameter D.

Figure 11A:
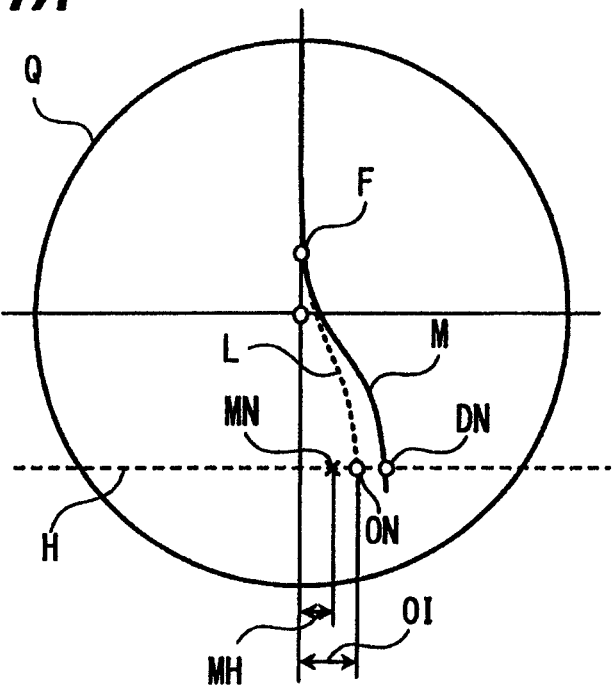
FIG. 11A is a front view of a progressive addition lens for right eye made for explaining the method for evaluating the progressive addition lens according to the present invention.

A case of evaluating a progressive addition lens designed using the aforesaid design method of the progressive addition lens according to the present invention will be described below. FIG. 11A is a front view of a progressive addition lens for right eye Q, which has the same configuration as the progressive addition lens Q shown in FIG. 4. The progressive addition lens Q is designed so that, with respect to the principal line of vision L, the design principal meridian curve M is displaced toward the nose side where the average power distribution or the astigmatism distribution is denser, according to the pupil diameter of the wearer of the lens. In FIG. 11A, like components are denoted by like reference numerals as of those of FIG. 4, and the explanation thereof will be omitted.

Figure 11B:
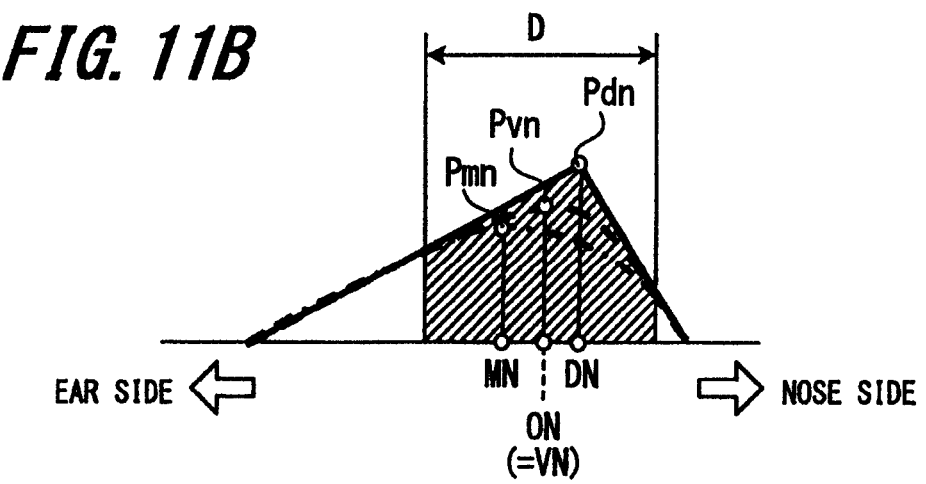
FIG. 11B is a graph showing a refractive power distribution of average power of the progressive addition lens for right eye shown in FIG. 11A.

Regarding the measurement position of the progressive addition lens Q in the case where the opening diameter D of the lens meter is greater than the pupil diameter E, there is an example of the refractive power distribution of the average power shown in FIG. 11B in which the peak value Pvn of the averaged distribution within the area of the pupil diameter E becomes smaller than the design peak value Pdn, and the peak value Pmn of the averaged distribution within the area of the opening diameter D of the lens meter becomes further smaller. Further, since the greater the width of the averaged area is, the more greatly the position of the peak value is displaced toward the side where the distribution is thinner, the point MN (which is the position of the profile curve H corresponding to the peak value Pmn) is displaced from the point ON (=VN)(which is the position corresponding to the peak value Pvn) toward the ear side. In such a case, as shown as the x-mark in the profile curve H of FIG. 11A, the point MN can be used as the measurement position of the lens meter.

Figure 12A:
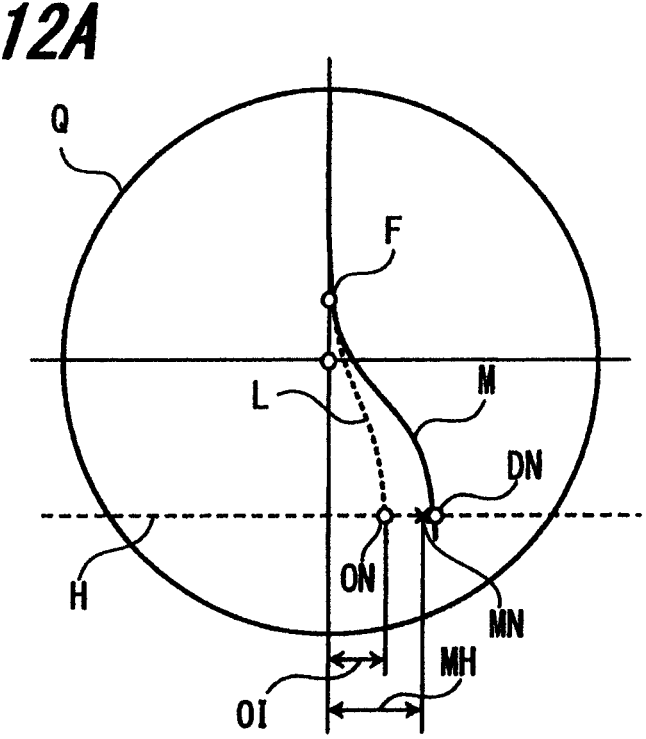
FIG. 12A is a front view of a progressive addition lens for right eye made for explaining the method for evaluating the progressive addition lens according to the present invention.
Figure 12B:
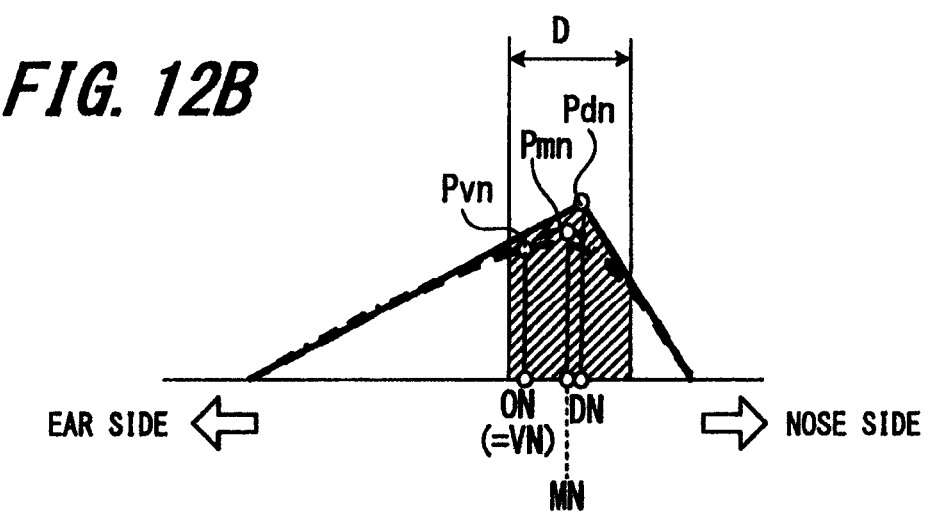
FIG. 12B is a graph showing a refractive power distribution of average power of the progressive addition lens for right eye shown in FIG. 12A.

In contrast, in the case where the opening diameter of the lens meter is smaller than the pupil diameter, as shown in FIG. 12A, the measurement position MN can be displaced from the point ON toward the nose side. In FIG. 12A, like components are denoted by like reference numerals as of those of FIG. 11A, and the explanation thereof will be omitted. In other words, as shown in FIG. 12B, in the case where the opening diameter D of the lens meter is smaller than the pupil diameter E, the peak value Pmn of the averaged distribution obtained by averaging the refractive power distribution of the progressive addition lens Q within the area of the opening diameter D is greater than the peak value Pvn of the averaged distribution obtained by averaging the refractive power distribution of the progressive addition lens Q within the area of the pupil diameter E, and therefore the position of the peak value Pmn is displaced toward the nose side. In such a case, as shown in FIG. 12A, the measurement can be performed at the point MN, which is displaced from the point ON toward the nose side.

As described with reference to FIGS. 10A to 12B, either in the case where the design principal meridian curve M and the principal line of vision L of the progressive addition lens are the same or in the case where the design principal meridian curve M and the principal line of vision L of the progressive addition lens are displaced from each other, by defining the peak position of the average power distribution or the peak position of the astigmatism distribution averaged within the opening diameter D of the lens meter as the inspection position where the amount of inward movement is to be inspected by the lens meter, it can be evaluated that the processing of the lens is performed in accordance with design if the amount of inward movement obtained based on the measured value at the inspection position becomes the preset amount of inward movement at the corrected inspection position.

Further, although the corrected position is used as the inspection position for inspecting the amount of inward movement in the aforesaid method, there is alternatively another method in which the measurement position is not corrected, but instead the inspected value is corrected and then the evaluation is performed based on the corrected inspected value.

In such a case, if the lens is the progressive addition lens Q shown in FIG. 11A, for example, the measurement is performed at the point ON of FIG. 11B. Here the target value of the measurement is not Pvn, but is a value obtained correcting value of the curve indicated by the dashed line, which is a curve averaged within the opening diameter D. So that the target value is corrected in such a manner, and if a value within the threshold is measured from the corrected target value, the amount of inward movement OI can be obtained, then it can be evaluated that the processing of the lens is performed in accordance with design.

Note that, as shown in FIGS. 12A and 13A, the shift amount MH of the point MN (the measurement position) from the point ON or point DN varies depending on the ratio of the size of the opening diameter D to the size of the pupil diameter E, the distribution state of average power or astigmatism, the power, and the like. Incidentally, in the case where the size of the opening diameter D of the lens meter and the size of the pupil diameter E of the wearer are the same (for example, both are 6 mm), the measurement position can be the point ON (=VN).

Further, the calculation method of the averaging procedure within the opening diameter D of the lens meter is not particularly limited but can also be the specific averaging method owned by each device. Further, the present invention can be applied to a progressive addition lens whose refractive power changes on its front surface, a progressive addition lens whose refractive power changes on its rear surface, and a progressive addition lens whose refractive power changes on its both surfaces.

Furthermore, unless there is a specific reason, it is not necessary to consider the average value within the pupil diameter and the average value within the opening diameter in the case where the distribution of the average power and the distribution of the astigmatism are averagely designed instead of being asymmetrical with the principal meridian curve as a boundary, or in the case where, although the distribution of the average power and the distribution of the astigmatism are asymmetrical, the density of the distributions almost do not change.

Figure 13:
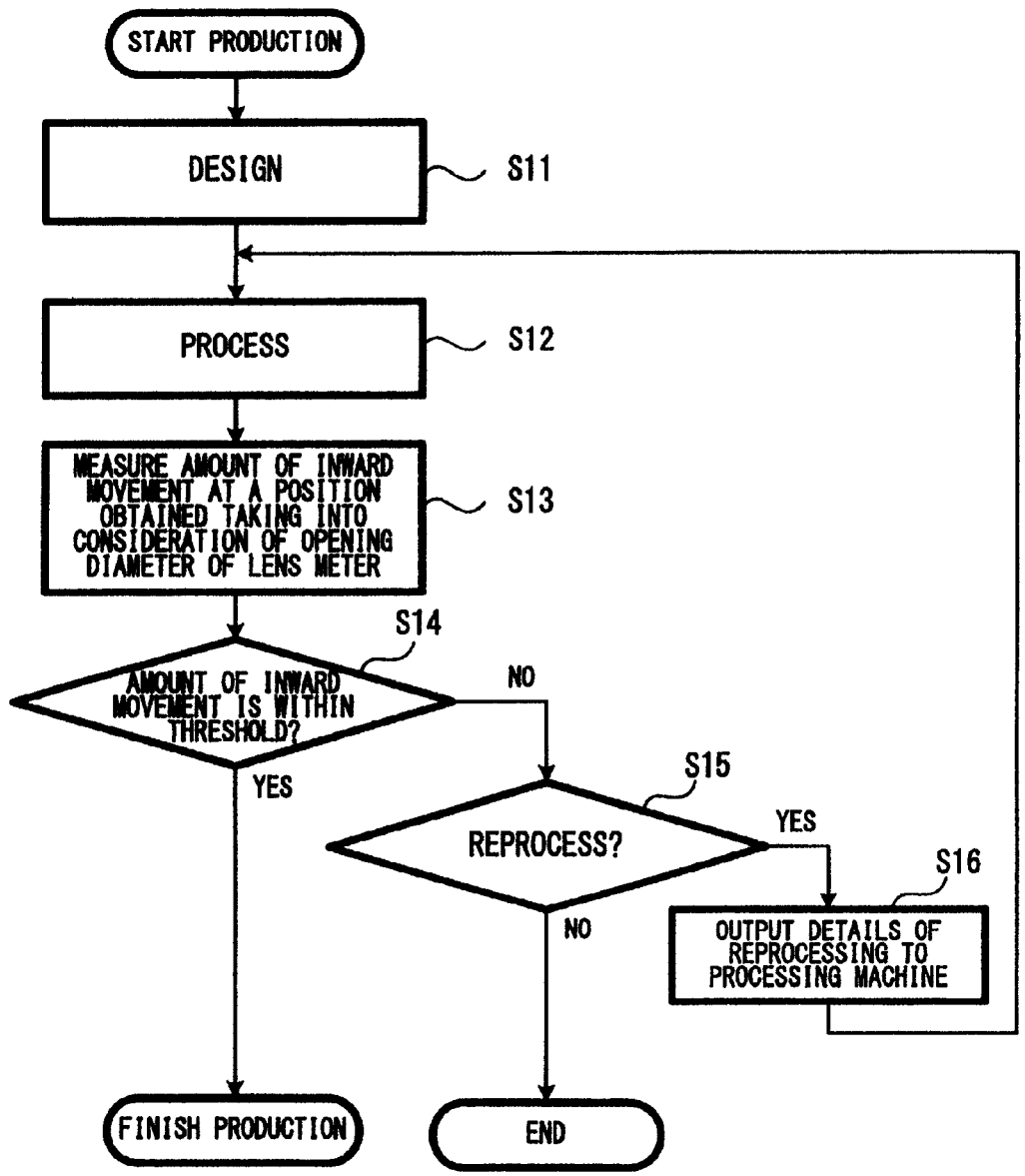
FIG. 13 is a flowchart for explaining the method for evaluating the progressive addition lens according to the present invention.

FIG. 13 is a flowchart for explaining the production process of the progressive addition lens including the evaluation step by the evaluation method of the progressive addition lens according to the aforesaid embodiment of the present invention. First, in the process of producing, the optical characteristics (such as power, refractive power distribution state, layout position and the like) of the progressive addition lens is designed (Step S11), and the lens is trial-produced according to the design (Step S12). Further, in the process of verifying whether or not the trial-produced lens is produced according to the design, the lens meter is placed at the measurement position which is determined taking into consideration of the opening diameter of the lens meter (i.e., the point MN shown in FIGS. 10A to 12B, which is the corrected measurement position) to measure the amount of inward movement (Step S13). The amount of inward movement is obtained based on the power measured at the point MN, and it is judged whether or not the amount of inward movement is within the threshold (Step S14). Further, if the amount of inward movement obtained based on the measurement is not within the threshold ("NO" in Step S14), then it is judged whether or not reprocessing should be done (for example, whether or not reprocessing is possible) (Step S15), and if it is judged that reprocessing should not be done ("NO" in Step S15), then the production is completed. If it is judged that reprocessing should be done ("YES" in Step S15), then the details of reprocessing (the places to be processed and the amount of processing) are outputted to the processing machine (Step S16) to perform reprocessing (Step S12). The aforesaid steps are performed repeatedly, and the production is completed until it is judged in Step S14 that the amount of inward movement is within the threshold ("YES" in Step S14).

By the aforesaid steps, it is possible to suppress the influence of the opening diameter of the lens meter (i.e., to suppress the influence caused by the error of the measuring device) to therefore accurately measure the amount of inward movement of the progressive addition lens, so that it is possible to more suitably evaluate the progressive addition lens.

Note that, although the design method of the progressive addition lens, the asymmetrical progressive addition lens designed using the design method, and the evaluation method for evaluating progressive-power are described above as the embodiments and examples of the present invention, it should be understood that the present invention is not limited to the aforesaid embodiments and examples, but includes various modifications and variations without departing from the spirit of the present invention described in the claims.

EXPLANATION OF REFERENCE NUMERALS

L principal line of vision
F position of front distance vision
ON position of front near vision
M design principal meridian curve
DN position of near vision in design principal meridian curve
H profile curve in horizontal direction
OI amount of inward movement of line-of-sight
DH amount of design inward movement
MN measurement position after correction
MH amount of inward movement for measurement

The invention claimed is:

1. A method for inspecting a progressive addition lens in a process of manufacturing the same, the lens designed so that at least one of an average power distribution and an astigmatism distribution is bilaterally asymmetrical in the horizontal direction with a design principal meridian curve as a boundary, the method comprising:
taking into consideration of an error caused by smoothing the average power distribution or the astigmatism distribution within a measurement range of a lens meter between an amount of inward movement, as a target value, at a position corresponding to a front near vision and an inspected value of the lens meter, correcting an error of an inspection position where the amount of inward movement is to be inspected by the lens meter, and evaluating the amount of inward movement at the corrected inspection position.

2. The method for inspecting the progressive addition lens according to claim 1, wherein either one of a peak position of the average power distribution smoothed within the measurement range of the lens meter and a peak position of the astigmatism distribution smoothed within the measurement range of the lens meter is selected as the corrected inspection position.

3. The method for evaluating the progressive addition lens according to claim 1, comprising:
setting an amount of inward movement MH of the measurement position and an amount of inward movement of line-of-sight OI,
wherein an expression $$MH<OI$$

is satisfied in a case where a pupil diameter E is greater than an opening diameter of the lens meter,
an expression $$MH=OI$$

is satisfied in a case where the pupil diameter E is equal to the opening diameter of the lens meter, and
an expression $$MH>OI$$

is satisfied in a case where the pupil diameter E is equal to the opening diameter of the lens meter,
when:
an intersecting line of a line-of-sight of a wearer of the progressive addition lens from a distance vision to a near vision and a refractive surface of the progressive addition lens is defined as a principal line of vision L;
in the principal line of vision, a position corresponding to a front distance vision and a position corresponding to the front near vision of the wearer of the progressive addition lens are respectively defined as a point F and a point ON;
a displacement of the point ON from the point F toward the nose side in the horizontal direction is defined as an amount of inward movement of line-of-sight OI;
an intersection of a profile curve in horizontal direction H and the design principal meridian curve M on the refractive surface of the progressive addition lens is defined as a point DN, in which the profile curve in horizontal direction H passes through the point ON in the principal line of vision, and the design principal meridian curve M passes through the point F of the front distance vision and has an interval where the power progressively changes from an upper portion toward a lower portion of the progressive addition lens;
a displacement of the point DN of the design principal meridian curve M from the point F of the front distance vision toward the nose side in the horizontal direction is defined as an amount of design inward movement DH;
a position in the profile curve in horizontal direction H at which a smoothed distribution reaches the maximum value is defined as a point VN, in which the smoothed distribution is calculated by smoothing the average power distribution or the astigmatism distribution along the profile curve in horizontal direction H, which passes through the point ON, within a range of the pupil diameter E of the wearer of the progressive addition lens;
the progressive addition lens is designed by selecting the amount of design inward movement DH so that a displacement VH of the point VN from the point F toward the nose side in the horizontal direction becomes close to the amount of inward movement of line-of-sight OI;

the measurement position of the lens meter for measuring the amount of inward movement of the progressive addition lens is defined as a point MN in the profile curve in horizontal direction H; and a displacement of the point MN from the point F of the front distance vision toward the nose side in the horizontal direction is defined as an amount of inward movement MH of the measurement position.

4. The method for inspecting the progressive addition lens according to claim 1, wherein the method is performed after processing of the lens in the process of manufacturing the lens.

5. The method for inspecting the progressive addition lens according to claim 1, wherein the method is performed in designing the lens after processing of the lens in the process of manufacturing the lens.

6. A method for inspecting a progressive addition lens in a process of manufacturing the same, the lens designed so that at least one of an average power distribution and an astigmatism distribution is bilaterally asymmetrical in the horizontal direction with a design principal meridian curve as a boundary, the method comprising:

taking into consideration of an error caused by smoothing the average power distribution or the astigmatism distribution within a measurement range of a lens meter between an amount of inward movement, as a target value, at a position corresponding to a front near vision and an inspected value of the amount of inward movement obtained by the lens meter, correcting an error of the inspected value of the amount of inward movement obtained by the lens meter, and evaluating the amount of inward movement based on the corrected inspected value.

7. The method for inspecting the progressive addition lens according to claim 6, wherein the method is performed after processing of the lens in the process of manufacturing the lens.

8. The method for inspecting the progressive addition lens according to claim 6, wherein the method is performed in designing the lens after processing of the lens in the process of manufacturing the lens.

* * * * *